US009715281B2

(12) United States Patent
Modarres et al.

(10) Patent No.: US 9,715,281 B2
(45) Date of Patent: *Jul. 25, 2017

(54) SYSTEMS AND METHODS FOR HAPTICALLY-ENABLED CONFORMED AND MULTIFACETED DISPLAYS

(71) Applicant: Immersion Corporation, San Jose, CA (US)

(72) Inventors: Ali Modarres, Montreal (CA); Danny Grant, Laval (CA)

(73) Assignee: Immersion Corporation, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/092,088

(22) Filed: Apr. 6, 2016

(65) Prior Publication Data

US 2016/0216767 A1 Jul. 28, 2016

Related U.S. Application Data

(63) Continuation of application No. 14/262,122, filed on Apr. 25, 2014, now Pat. No. 9,335,823.

(Continued)

(51) Int. Cl.
*G06F 3/041* (2006.01)
*G06F 3/01* (2006.01)
(Continued)

(52) U.S. Cl.
CPC ............. *G06F 3/016* (2013.01); *G06F 1/163* (2013.01); *G06F 1/1641* (2013.01);
(Continued)

(58) Field of Classification Search
USPC ........................................................ 345/173
See application file for complete search history.

(56) References Cited

U.S. PATENT DOCUMENTS

2008/0303782 A1  12/2008  Grant et al.
2010/0066643 A1   3/2010  King et al.
(Continued)

FOREIGN PATENT DOCUMENTS

EP          2 192 750          6/2010
WO     WO 2013/004919        1/2013

OTHER PUBLICATIONS

European Patent Office, Communication, Application No. 14166094, dated Sep. 22, 2014.

*Primary Examiner* — Gustavo Polo
(74) *Attorney, Agent, or Firm* — Kilpatrick Townsend & Stockton LLP

(57) ABSTRACT

One illustrative system disclosed herein includes a touch-sensitive surface, which includes: a first surface on a first plane; and a second surface adjacent to the first surface, wherein the second surface is on a second plane different from the first plane. The illustrative system also includes a haptic output device configured to receive a haptic signal and output a haptic effect. Further, the illustrative system includes a processor coupled to the haptic output device and the touch-sensitive surface, the processor configured to: determine an event; determine the haptic effect based at least in part on the event; determine the haptic signal based at least in part on the haptic effect; and transmit the haptic signal associated with the haptic effect to the haptic output device.

20 Claims, 5 Drawing Sheets

Related U.S. Application Data

(60) Provisional application No. 61/816,605, filed on Apr. 26, 2013.

(51) Int. Cl.
  *G06F 3/0488* (2013.01)
  *G06F 1/16* (2006.01)
  *G06F 3/045* (2006.01)
  *G06F 3/0487* (2013.01)

(52) U.S. Cl.
  CPC .......... *G06F 1/1643* (2013.01); *G06F 1/1652* (2013.01); *G06F 3/045* (2013.01); *G06F 3/0412* (2013.01); *G06F 3/0414* (2013.01); *G06F 3/0416* (2013.01); *G06F 3/0487* (2013.01); *G06F 3/0488* (2013.01); *G06F 3/04883* (2013.01); *G06F 2203/04102* (2013.01); *G06F 2203/04104* (2013.01)

(56) References Cited

U.S. PATENT DOCUMENTS

| | | |
|---|---|---|
| 2011/0261002 A1 | 10/2011 | Verthein |
| 2013/0076649 A1 | 3/2013 | Myers et al. |
| 2015/0009168 A1 | 1/2015 | Levesque et al. |

SYSTEMS AND METHODS FOR HAPTICALLY-ENABLED CONFORMED AND MULTIFACETED DISPLAYS

REFERENCE TO RELATED APPLICATION

This application is a continuation of and claims priority to U.S. patent application Ser. No. 14/262,122, filed on Apr. 25, 2014, and entitled "Systems and Methods for Haptically-Enabled Conformed and Multifaceted Displays," which claims priority to U.S. Provisional Patent Application No. 61/816,605, entitled "Haptic Augmentation of Continuous Interactions with Bendable Displays," filed Apr. 26, 2013, the entirety of both of which is hereby incorporated by reference herein.

FIELD OF THE INVENTION

The present invention relates to the field of user interface devices. More specifically, the present invention relates to haptically-enabled conformed and multifaceted displays.

BACKGROUND

As computer-based systems become more prevalent, the quality of the interfaces through which humans interact with these systems is becoming increasingly important. One interface that is of growing popularity due to its intuitive and interactive nature is the touch-screen display. Through a touch-screen display, a user can perform a variety of tasks by contacting a region of the touch-screen with the user's finger. In order to create a more intuitive and enhanced user experience, designers often leverage user experience with physical interactions. This is generally done by reproducing some aspects of interactions with the physical world through visual, audio, and/or haptic feedback. Haptic feedback often takes the form of a mechanical vibration or a perceived change in a coefficient of friction. Recently, multifaceted touch-screen displays and permanently-conformed touch-screen displays have been developed. Accordingly, there is a need to provide haptic effects for these multifaceted and permanently-conformed touch-screen displays.

SUMMARY

Embodiments of the present disclosure comprise computing devices comprising haptically-enabled conformed and multifaceted displays. In one embodiment, a system of the present disclosure may comprise a touch-sensitive surface comprising: a first display on a first plane; and a second surface adjacent to the first surface, wherein the second surface is on a second plane different from the first plane. The system may also comprise a haptic output device configured to receive a haptic signal and output a haptic effect. Further, the system may comprise a processor coupled to the haptic output device and the touch-sensitive surface, the processor configured to: determine an event; determine the haptic effect based at least in part on the event; determine the haptic signal based at least in part on the haptic effect; and transmit the haptic signal associated with the haptic effect to the haptic output device.

In another embodiment, a method of the present disclosure may comprise: determining an event; determining a haptic effect based at least in part on the event; determining a haptic signal based at least in part on the haptic effect; and transmitting the haptic signal associated with the haptic effect to a haptic output device, wherein the haptic output device is configured to output a haptic effect to a touch-sensitive surface. In some embodiments, the touch-sensitive surface comprises: a first surface on a first plane; and a second surface adjacent to the first surface, wherein the second surface is on a second plane different from the first plane. Yet another embodiment comprises a computer-readable medium for implementing such a method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
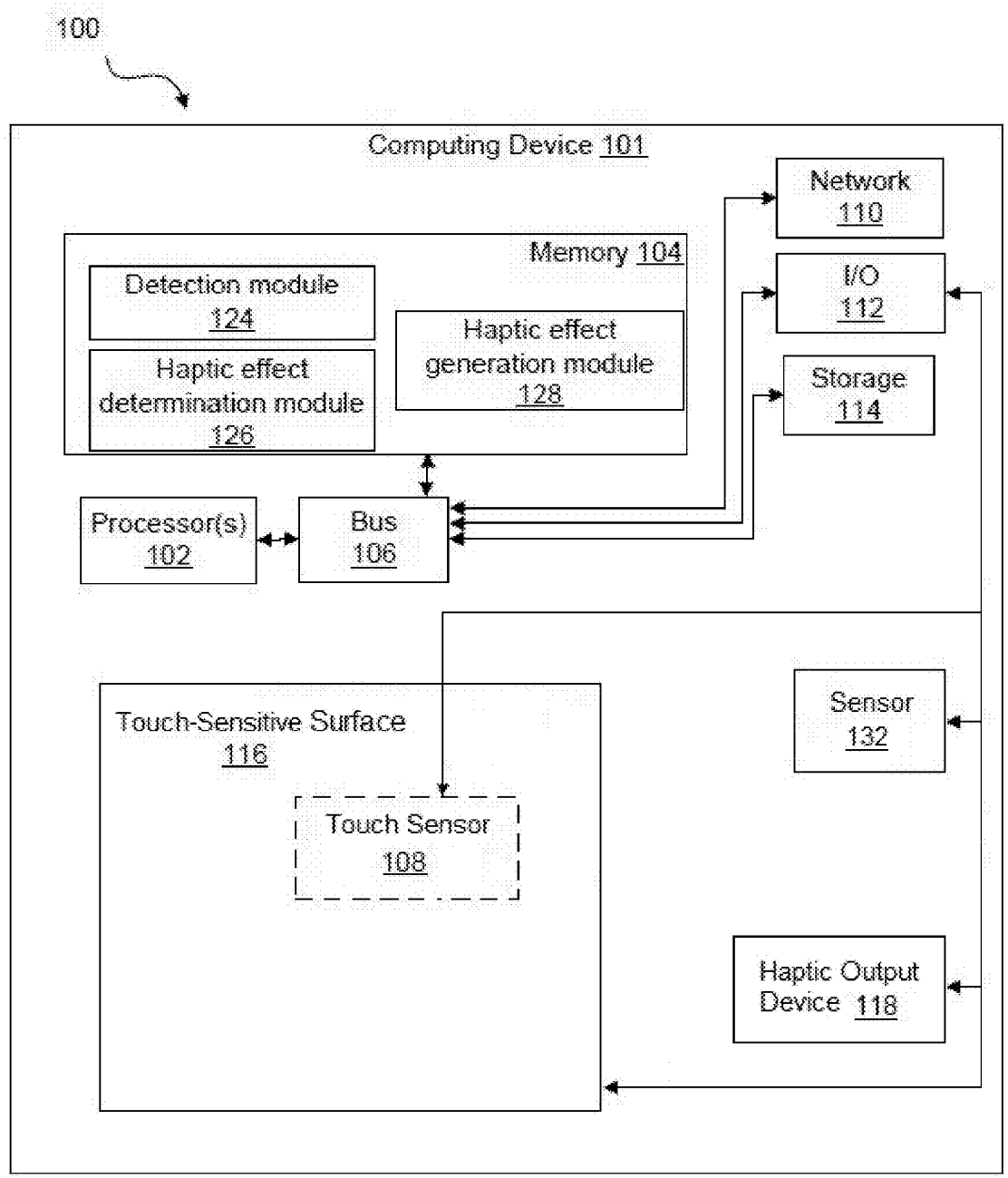
FIG. 1 is a block diagram showing a system for providing haptically-enabled conformed and multifaceted displays according to one embodiment.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Examples of Haptically-Enabled Conformed and Multifaceted Displays One illustrative embodiment of the present disclosure comprises a mobile device, such as a tablet. The mobile device comprises a touch-screen display, a memory, and a processor in communication with each of these elements.

In the illustrative embodiment, the touch-screen display comprises a permanently conformed display (hereinafter a "conformed display"). A conformed display is a display that is conformed to a nonplanar shape and substantially fixed in that shape. For example, in the illustrative embodiment, the touch-screen display is conformed around the surface of the mobile device, such that the touch-screen display wraps around the front and sides of the mobile device. That is, in the illustrative embodiment, the touch-screen display covers portions of the front and sides of the mobile device.

In the illustrative embodiment, the mobile device outputs a virtual object, for example a virtual coffee cup, on the touch-screen display. Because of the curvature of the conformed display, the user may perceive the front and sides of a virtual object (i.e., the user may perceive a 180 degree field of view). For example, the user may perceive the top of the virtual coffee cup on the portion of the touch-screen display covering the front of the mobile device. Further, the user may perceive the sides of the virtual coffee cup on the sides of the touch-screen display conformed around the sides of the mobile device. Further still, the user may perceive the lip of the virtual coffee cup on the portion of the touch-screen display transitioning between the front and sides of the mobile device.

The mobile device further comprises a haptic output device. The haptic output device receives a signal from the mobile device and outputs a haptic effect to the user. The mobile device is configured to output a haptic effect upon the occurrence of an event. An event, as used herein, is any interaction, action, collision, or other event which occurs during operation of the device which can potentially comprise an associated haptic effect. In some embodiments, an event may comprise user input (e.g., interaction with a real or virtual button; manipulating a joystick; interacting with a touch surface; or tilting or orienting a computing device), a system status (e.g., low battery, low memory, or a system notification, such as a notification generated based on the system receiving an incoming call), sending data, receiving data, or a program event (e.g., if the program is a game, a program event may comprise explosions, collisions, or interactions between game objects, or advancing to a new level).

For example, in the illustrative embodiment, the user may interact with the top or sides of the virtual coffee cup by touching a portion of the touch-screen display covering the front or sides of the mobile device, respectively. In the illustrative embodiment, in response to the user interaction, the mobile device outputs a haptic effect. For instance, in the illustrative embodiment, when the user interacts with the top of the virtual coffee cup, the mobile device may output a haptic effect configured to reduce a perceived coefficient of friction on the surface of the touch-screen display. Reducing the perceived coefficient of friction on the surface of the touch-screen display may, for example, simulate air in an empty coffee cup or steam coming off hot coffee inside the coffee cup. Further, in the illustrative embodiment, when the user interacts with the lip of the virtual coffee cup, the mobile device may output a haptic effect configured to increase the perceived coefficient of friction. Increasing the perceived coefficient of friction on the surface of the touch-screen display may simulate the lip of a porcelain coffee cup. Further still, in the illustrative embodiment, when the user interacts with the sides of the virtual coffee cup, which may comprise, for example, a raised graphic design, the mobile device may output one or more haptic effects (e.g., vibrations or simulated textures) configured simulate the graphic design.

The description of the illustrative embodiment above is provided merely as an example. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Haptically-Enabled Conformed and Multifaceted Displays

FIG. 1 is a block diagram showing a system 100 for haptically-enabled conformed and multifaceted displays according to one embodiment. In the embodiment shown, system 100 comprises a computing device 101 having a processor 102 in communication with other hardware via bus 106. Computing device 101 may comprise, for example, a smartphone, tablet, e-reader, laptop computer, desktop computer, game console, game controller, medical device, automobile computer, portable gaming device, or a wearable device, such as a watch, wristband, ring, bracelet, or anklet.

A memory 104, which can comprise any suitable tangible (and non-transitory) computer-readable medium such as RAM, ROM, EEPROM, or the like, embodies program components that configure operation of the computing device 101. In the embodiment shown, computing device 101 further includes one or more network interface devices 110, input/output (I/O) interface components 112, and storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate wired or wireless connection to devices such as one or more displays, game controllers, keyboards, mice, joysticks, cameras, buttons, speakers, microphones, and/or other hardware used to input data or output data. Storage 114 represents nonvolatile storage such as magnetic, optical, or other storage media included in device 101 or coupled to processor 102.

System 100 further includes a touch-sensitive surface 116, which, in this example, is integrated into computing device 101. Touch-sensitive surface 116 comprises any surface that is configured to sense tactile input of a user. Touch-sensitive surface 116 may comprise a touch-sensitive display. For example, touch-sensitive surface 116 may comprise a display and one or more layers of material above the actual display components. One or more touch sensors 108 are configured to detect a touch in a touch area when an object contacts a touch-sensitive surface 116 and provide appropriate data for use by processor 102. Any suitable number, type, or arrangement of sensors can be used. For example, resistive and/or capacitive sensors may be embedded in touch-sensitive surface 116 and used to determine the location of a touch and other information, such as pressure, speed, and/or direction. As another example, optical sensors with a view of the touch-sensitive surface 116 may be used to determine the touch position.

In other embodiments, the touch sensor 108 may comprise a LED detector. For example, in one embodiment, touch-sensitive surface 116 may comprise a LED finger detector mounted on the side of a display. In some embodiments, the processor 102 is in communication with a single touch sensor 108, in other embodiments, the processor 102 is in communication with a plurality of touch sensors 108, for example, a first touch screen and a second touch screen. The touch sensor 108 is configured to detect user interaction, and based on the user interaction, transmit signals to processor 102. In some embodiments, touch sensor 108 may be configured to detect multiple aspects of the user interaction. For example, touch sensor 108 may detect the speed and pressure of a user interaction, and incorporate this information into the interface signal.

Figure 2:
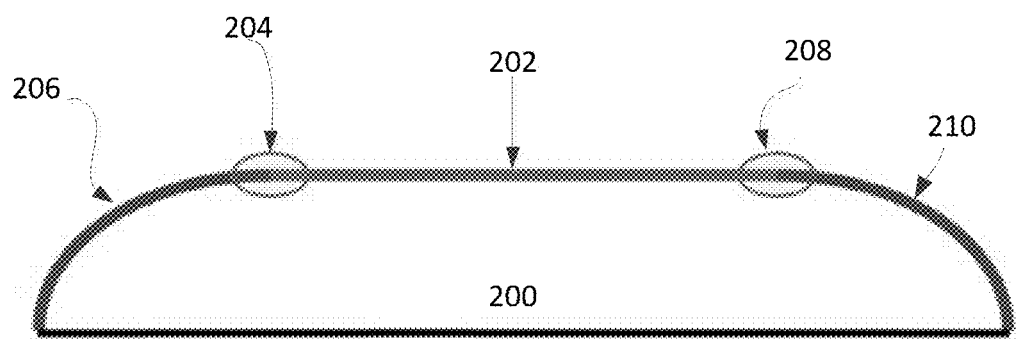
FIG. 2 shows one embodiment of a system for providing haptically-enabled conformed and multifaceted displays.

In some embodiments, the touch-sensitive surface 116 may comprise a conformed display, for example, the conformed display shown in FIG. 2. In the embodiment shown in FIG. 2, the conformed display 200 comprises a first display surface 202. The conformed display 200 also comprises a display transition zone 204, which physically transitions and connects between the first display surface 202 and a second display surface 206. The second display surface 206 is adjacent to the first display surface 202 and on a different plane than the first display surface 202. Further, in this example, the conformed display 200 comprises another display transition zone 208, which physically transitions and connects between the first display surface 202 and a third display surface 210. The third display surface 210 is adjacent to the first display surface 202 and on a different plane than the first display surface 202 and/or the second display surface 206. In some embodiments, the sizes display surfaces (e.g., the first display surface 202, the second display surface 206, the third display surface 210) and the display transition zones (e.g., display transition zone 204, and the display transition zone 208) may be larger or smaller. For example, in some embodiments, the display transition zone 204 and/or display transition zone 208 may be larger, and may encompass more of the curvature of the conformed display 200.

In some embodiments, upon a user interacting with the conformed display 200, a computing device may output one or more haptic effects. For example, in some embodiments, upon the user interacting with the display transition zone 204 or the second display surface 206, the computing device may output a haptic effect. For instance, the computing device may output a haptic effect configured to increase the amount of the curvature in the conformed display 200 perceived by the user.

In this example, the first display surface 202 comprises a substantially planar shape. Further, the second display surface 206 and third display surface 210 each comprise a curved shape. In other embodiments, each of the display surfaces (e.g., the first display surface 202, second display surface 206, and third display surface 210) may comprise a substantially planar or curved shape. Similarly, each of the display transition zones may comprise a substantially planar shape or a curved shape. A conformed display 200 may comprise any number of display surfaces and display transition zones, with any configuration.

Figure 3:
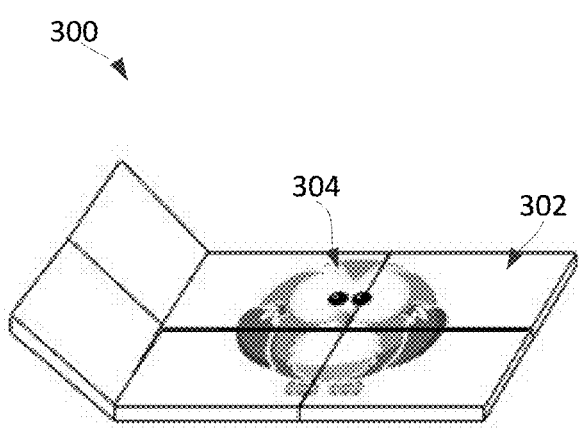
FIG. 3 shows another embodiment of a system for providing haptically-enabled conformed and multifaceted displays.

In other embodiments, the touch-sensitive surface 116 may comprise a multifaceted display, for example, the multifaceted display shown in FIG. 3. Multifaceted displays 300 comprise a plurality of individual displays 302 that are mechanically connected. Each of the individual displays 302 may have a curved or planar shape. In some embodiments, the individual displays 302 may be connected by a moveable joint, for example, a hinge. In some embodiments, the individual displays 302 may be connected by a bendable or flexible member, for example, a film hinge. In such embodiments, the individual displays 302 may be able to bend relative to one another.

In some embodiments, upon the occurrence of an event, the computing device may output one or more haptic effects to one or more of the individual displays 302 and/or connections between the individual displays 302. For example, in some embodiments, upon a user interacting with a connection between individual displays 302, the computing device may output a haptic effect. For example, the computing device may output a haptic effect comprising a vibration.

The individual displays 302 may output one or more virtual objects 304. In the example shown in FIG. 3, the individual displays 302 are outputting portions of a virtual object 304 that, when combined, make up the entire virtual object 304. In other embodiments, each of the individual displays 302 may output different views or sides of a virtual object. For example, in some embodiments, the multifaceted display 300 may comprise individual displays 302 (e.g., six individual displays 302) configured in a cube formation. In some embodiments, each of the individual displays 302 may output different views (e.g., the top, bottom, right, left, front, and back) of the virtual object (e.g., a virtual human heart). In some embodiments, the user may perceive the virtual object in three dimensions.

Referring back to FIG. 1, in some embodiments, the touch-sensitive surface 116 may be conformed around a surface. In some embodiments, the touch-sensitive surface 116 may be conformed around the surface of the computing device 101. For example, in some embodiments comprising a multifaceted display, the plurality of individual displays may be bent relative to one another such that the touch-sensitive surface 116 conforms around the surface of a computing device 101. Further, while the touch-sensitive surface 116 is shown internal to the computing device 101, in some embodiments, the touch-sensitive surface 116 may be external to and in communication with the computing device 101. For example, in some embodiments, the touch-sensitive surface 116 may be conformed around an external device, for example, a desk, chair, pole, part of a user's body (e.g., ankle), or kiosk.

Computing device 101 also comprises one or more additional sensors 132. The sensors 132 are configured to transmit sensor signals to the processor 102. In some embodiments, the sensor 132 may comprise, for example, a gyroscope, a magnetometer, an accelerometer, a pressure sensor, a strain gauge, a global positioning system (GPS) unit, a range sensor, or a depth sensor. In some embodiments, the gyroscope, accelerometer, and GPS unit may detect an orientation, acceleration, and location of computing device 101, respectively. In some embodiments, the processor 102 may be in communication with a single sensor 132 and, in other embodiments, the processor 102 may be in communication with a plurality of sensors 132, for example, a gyroscope and an accelerometer.

System 100 further includes a haptic output device 118 in communication with processor 102. Haptic output device 118 is configured to output a haptic effect in response to a haptic signal. In some embodiments, haptic output device 118 is configured to output a haptic effect comprising, for example, a vibration, a change in a perceived coefficient of friction, a simulated texture, a change in a perceived temperature, or a surface deformation. In the embodiment shown in FIG. 1, the haptic output device 118 is internal to the computing device 101. In other embodiments, the haptic output device 118 may be remote from the computing device 101, but communicatively coupled to the processor 102. For example, the haptic output device 118 may be external to and in communication with the computing device 101 via wired interfaces such as Ethernet, USB, IEEE 1394, and/or wireless interfaces such as IEEE 802.11, Bluetooth, or radio interfaces. In some embodiments, the haptic output device 118 may be coupled to the touch-sensitive surface 116.

In some embodiments, the haptic output device 118 may output a haptic effect by vibrating the computing device 101 or a component of the computing device 101, e.g., the touch-sensitive surface 116. In such embodiments, haptic output device 118 may comprise a haptic output device configured to output a vibration, e.g., one or more of a piezoelectric actuator, an electric motor, an electro-magnetic actuator, a voice coil, a shape memory alloy, an electroactive polymer, a micro fiber composite, a solenoid, an eccentric rotating mass motor (ERM), or a linear resonant actuator (LRA).

In some embodiments, the haptic output device 118 may be configured to output a haptic effect simulating a texture or modulating the perceived coefficient of friction on the touch-sensitive surface 116 in response to a haptic signal. In some embodiments, the haptic output device 118 may comprise an ultrasonic actuator. An ultrasonic actuator may vibrate at an ultrasonic frequency, for example 20 kHz, increasing or reducing the perceived coefficient at the surface of touch-sensitive surface 116. Further, an ultrasonic actuator may comprise a piezo-electric material.

In other embodiments, the haptic output device 118 may use electrostatic attraction, for example by use of an electrostatic surface actuator, to output a haptic effect simulating a texture or modulating the perceived coefficient of friction on the touch-sensitive surface 116. In some embodiments, the electrostatic actuator may comprise a conducting layer and an insulating layer. The conducting layer comprises any semiconductor or other conductive material, such as copper, aluminum, gold, or silver. The insulating layer comprises any insulating material, for example, glass, plastic, or polymer. Furthermore, the processor 102 may operate the electrostatic actuator by applying an electric signal, for example an AC signal, to the conducting layer. In some embodiments, the AC signal may be generated by a high-voltage amplifier. The electric signal may, in some embodiments, create capacitive coupling between the conducting layer and an object (e.g., a user's finger, head, foot, arm, shoulder, leg, or other body part, or a stylus) near or touching the haptic output device 118. In some embodiments, varying the levels of attraction between the object and the conducting layer can vary the simulated texture on an object moving across a surface (e.g., touch-sensitive surface 116) associated with the haptic output device 118.

In some embodiments, the haptic output device 118 may comprise a deformation device configured to output a haptic effect by deforming the surface of the touch-sensitive surface 116 or another surface of the computing device 101. In some embodiments, the haptic output device 118 may comprise fluid, for example, a smart gel. A smart gel may comprise a fluid with mechanical or structural properties that change in response to a stimulus or stimuli (e.g., an electric field, a magnetic field, temperature, ultraviolet light, shaking, or a pH variation). For example, in some embodiments, one or more wires may be embedded in or coupled to the smart gel. As current runs through the wires, heat is emitted, causing the smart gel to expand or contract, deforming the haptic output device 118. Further, in some embodiments, the haptic output device 118 may comprise a rheological (e.g., a magneto-rheological or electro-rheological) fluid. A rheological fluid may comprise metal particles (e.g., iron particles) suspended in a fluid (e.g., oil or water). In response to an electric or magnetic field, the order of the molecules in the fluid may realign themselves, which may change the overall damping and/or viscosity of the fluid, deforming the haptic output device 118.

In other embodiments, the haptic output device 118 may comprise an actuator coupled to an arm that rotates a deformation component. The deformation component may comprise, for example, an oval, starburst, or corrugated shape. The deformation component may be configured to move the touch-sensitive surface 116 at some rotation angles but not others. The actuator may comprise a piezo-electric actuator, rotating/linear actuator, solenoid, an electroactive polymer actuator, macro fiber composite (MFC) actuator, shape memory alloy (SMA) actuator, and/or other actuator. As the actuator rotates the deformation component, the deformation component may move the surface of the haptic output device 118, causing it to deform. In some embodiments, the deformation component may begin in a position wherein the touch-sensitive surface 116 is flat. In response to receiving a signal from processor 102, the actuator may rotate the deformation component. In some embodiments, rotating the deformation component may cause one or more portions of the touch-sensitive surface 116 to raise or lower. The deformation component may, in some embodiments, remain in this rotated state until the processor 102 signals the actuator to rotate the deformation component back to its original position.

In some embodiments, the haptic output device 118 may be a portion of the housing of the touch-sensitive surface 116. In other embodiments, the haptic output device 118 may be housed inside a flexible housing overlaying the touch-sensitive surface 116. Although a single haptic output device 118 is shown here, some embodiments may use multiple haptic output devices of the same or different type to provide haptic feedback. Some haptic effects may utilize an actuator coupled to a housing of the device, and some haptic effects may use multiple actuators in sequence and/or in concert. For example, in some embodiments, multiple vibrating actuators and electrostatic surface actuators can be used alone or in concert to provide different haptic effects.

Turning to memory 104, program components 124, 126, and 128 are depicted to show how a device can be configured in some embodiments to provide haptically-enabled conformed and multifaceted displays. In this example, a haptic detection module 124 configures processor 102 to monitor touch-sensitive surface 116 via touch sensor 108 to determine a position of a touch. For example, haptic detection module 124 may sample touch sensor 108 in order to track the presence or absence of a touch and, if a touch is present, to track one or more of the location, path, velocity, acceleration, pressure and/or other characteristics of the touch over time.

Haptic effect determination module 126 determines a haptic effect based on the occurrence of events. Haptic effect determination module 126 represents a program component that analyzes data to determine a haptic effect to generate. For example, haptic effect determination module 126 may comprise code that determines, based on the location of the touch on the touch-sensitive surface 116, a haptic effect to output and code that selects one or more haptic effects to provide in order to simulate the effect. For example, different haptic effects may be selected based on the location of a touch in order to simulate the presence of a virtual object (e.g., a virtual plant, automobile, animal, cartoon character, button, lever, logo, or person) on the touch-sensitive surface 116 (e.g., on a touch-sensitive display). Further, in some embodiments, haptic effect determination module 126 may comprise code that determines, based on the size, color, location, texture, movement, and/or other characteristics of a virtual object, a haptic effect to output and code that selects one or more haptic effects to provide in order to simulate the effect. For example, haptic effects may be selected based on the texture of a virtual object (e.g., a strong vibration if the texture of the virtual object is bumpy, and a perceived decrease in a coefficient of friction if the texture of the virtual object is smooth).

In some embodiments, haptic effect determination module 126 may determine a haptic effect based on program or game events. For example, in some embodiments, the computing device 101 may comprise a game in which a user navigates a virtual avatar through a virtual space. In some embodiments, if the user's virtual avatar strikes another virtual object (e.g., a virtual wall), the haptic effect determination module 126 may determine a haptic effect configured to simulate a collision. For example, haptic effect determination module 126 may determine a haptic effect comprising a vibration with a magnitude proportional to the speed of impact between the avatar and the virtual object. That is, the higher the speed of impact between the avatar and the virtual object, the higher the magnitude of the vibration.

In other embodiments, haptic effect determination module 126 may determine a haptic effect based at least in part on sensor signals received from sensor 132. For example, in some embodiments, the sensor 132 may comprise a gyroscope. The processor 102 may receive sensor signals from the gyroscope and determine the orientation of the computing device 101. Based on this determination, the haptic effect determination module 132 may determine a haptic effect. For example, in some embodiments, the processor 102 may determine that the computing device 101 is tilted 90 degrees. Based on this determination, the haptic effect determination module 126 may determine the haptic effect comprising, for example, a strong vibration.

The haptic effect generation module 128 represents programming that causes the processor 102 to transmit a haptic signal to the haptic output device 118 to generate the selected haptic effect. For example, the haptic effect generation module 128 may access stored waveforms or commands to send to the haptic output device 118. As another example, the haptic effect generation module 128 may comprise algorithms to determine the haptic signal. The haptic effect generation module 128 may comprise algorithms to determine target coordinates for the haptic effect. These target coordinates may comprise, for example, a location on the touch-sensitive surface 116.

Figure 4:
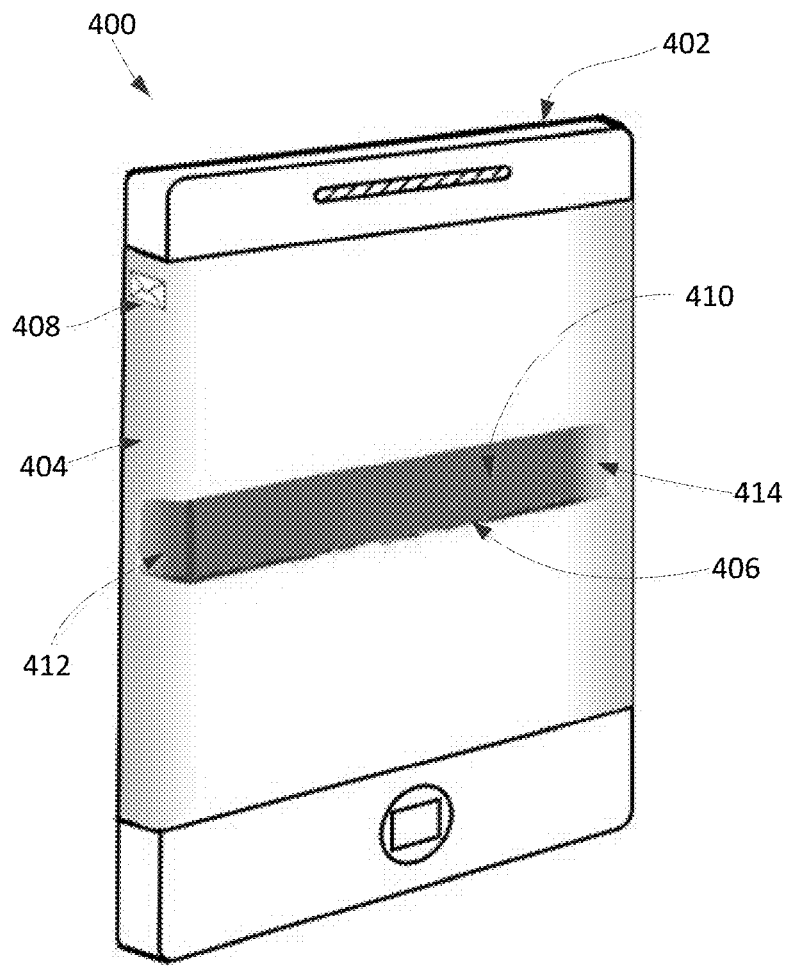
FIG. 4 shows another embodiment of a system for providing haptically-enabled conformed and multifaceted displays.

FIG. 4 shows another embodiment of a system for providing haptically-enabled conformed and multifaceted displays. The system 400 comprises a computing device 402. In some embodiments, the computing device 402 may comprise, for example, a tablet, e-reader, medical device, laptop computer, desktop computer, kiosk, alarm system, or a car computer. In this example, the computing device 402 comprises a smart phone.

The computing device 402 further comprises a display. In this example, the display comprises a conformed display 404. The conformed display 404 is conformed around the surface of the computing device 402. That is, the conformed display 404 wraps around the front and sides of the computing device 402. In some embodiments, the conformed display 404 may further wrap around the back, top, and/or bottom of the computing device 402. In other embodiments, the display may comprise a multifaceted display. In some embodiments, the multifaceted display may be conformed around the surface of the computing device 402.

In some embodiments, the display may output one or more virtual objects 406 (e.g., virtual cars, people, houses, furniture, plants, animals, buttons, sliders, or menus). In this example, the conformed display 404 is outputting a virtual object 406 comprising a brick. In some embodiments, because of the curve in the conformed display 404 around the sides of the computing device 402, a user may perceive not only the front 410 of the virtual object 406, but also sides 412, 414 of the virtual object 406. Thus, a user may perceive a 180 degree field of view associated with the virtual object 406.

In some embodiments, a user may interact with the virtual object 406 by interacting with (e.g., gesturing, tapping, or sliding a finger across) the surface of the display. For example, the user may interact with the virtual brick by touching an area of the conformed display 404 associated with the virtual brick. Further, in some embodiments, the user may interact with the virtual object 406 and/or the computing device 402 by tilting, shaking, or moving the computing device 402.

Upon the occurrence of an event, such as user input, the computing device 402 may output one or more haptic effects. For example, in some embodiments, as a user interacts with the front 410 of the virtual brick, the computing device 402 may output a haptic effect. In some embodiments, the haptic effect may comprise a simulated texture, for example, the texture of a brick. In some embodiments, as the user slides a finger across the transition zone between the front and left side of the conformed display 404, the computing device 402 may output another haptic effect. In some embodiments, this haptic effect may combine the feeling of the smooth curve formed in the shape of the conformed display 404 with another haptic effect. For example, in some embodiments, the natural curve of the conformed display 404 may be combined with a haptic effect comprising, for example, a pulsed vibration configured to simulate the edge of the brick. In some embodiments, the computing device 402 may output a haptic effect strong enough to offset the feeling of the natural curve of the conformed display 404. In some embodiments, to simulate a softer edge of a brick, the computing device 402 may output a haptic effect comprising, for example, a low-magnitude vibration with a long duration. To simulate a sharper edge of a brick, the computing device 402 may output a high-magnitude vibration with a short duration. Thus, in some embodiments, as a user interacts with the transition zone between the front and left side of the confirmed display 404, the user may perceive the edge of a brick.

Further, in some embodiments, as the user slides a finger across the left side of the conformed display 404, the computing device 402 may output another haptic effect. For example, in some embodiments, the computing device may output a simulated brick texture that a user may perceive as rougher than the simulated brick texture output when a user interacts with the front of the conformed display 404. By outputting haptic effects based on the characteristics of a virtual object, an area of the display with which the user is interacting, or both, the user may perceive a more realistic and immersive user experience.

In some embodiments, the computing device 402 may comprise a medical device. The medical device may comprise a conformed display 404. The medical device may be used for determining medical conditions, for example, medical conditions associated with the heart or brain. In some embodiments, the computing device 402 may output a virtual object 406 associated with the medical condition, for example, a virtual representation of a patient's brain. The characteristics of the virtual representation of the patient's brain may have been determined via a medical procedure, for example, a magnetic resonance imaging (MRI) scan.

In some embodiments, a user may interact with the virtual representation of the patient's brain by interacting with the conformed display 404. In response to the user interaction, the computing device 402 may output haptic effects. For example, the computing device 402 may output haptic effects comprising textures, such as rough, smooth, or bumpy textures. In some embodiments, the haptic effects may be associated with the characteristics of the portion of the virtual representation of the patient's brain with which a user is interacting. For example, if the user interacts with an area of the conformed display 404 associated with a bumpy area on the virtual brain, the computing device 402 may output a bumpy texture. In some embodiments, as the user interacts with areas of the front and sides of the conformed display 404 associated with the virtual brain, the computing device 402 may output haptic effects associated with the front and sides of the virtual brain, respectively. Thus, in some embodiments, a user may perceive characteristics of the virtual brain more realistically, which may allow the user to determine and diagnose medical conditions more effectively.

In some embodiments, the computing device 402 may output a haptic effect upon the occurrence of a program event or system status (e.g., low battery). For example, in some embodiments, upon the computing device 402 receiving a new e-mail, the computing device 402 may output a haptic effect comprising, for example, a deformation of the surface of the conformed display 404. Further, in some embodiments, the haptic effect may be based upon the characteristics of the program event. For example, the computing device 402 may output additional or different haptic effects (e.g., an increase in the size of the surface deformation) depending on the number of new e-mail messages received. In some embodiments, the haptic effect may be configured to change the perceived curvature of the display 404. For example, in some embodiments, the user may perceive the natural curvature of the display 404 if the user has no new e-mails. Upon the computing device 402 receiving a new e-mail, the computing device 402 may output a haptic effect comprising, for example, a haptic effect configured to cause the user to perceive the curvature of the display 404 as sharp. In some embodiments, the computing device 402 may output a haptic effect configured to increase the sharpness (e.g., minimize the perceived curvature) of the display 404 perceived by the user in proportion to the number of e-mails received by the user. For example, in some embodiments, upon the user interacting with the conformed display 404, the computing device 402 may output a haptic effect comprising a vibration with a magnitude that increases proportionally, and/or a duration that decreases proportionally, with the number of e-mails received.

In some embodiments, the haptic effect may be localized to a specific area on the display, for example, the haptic effect may be localized to the top left side 408 of the conformed display 404. In some embodiments, a user may be able to determine the occurrence of a program event without having to look at the display, which may provide an enhanced user experience. For example, the user may be able to feel the top left side 408 of a computing device 402 (e.g., smart phone) which may be, for example, positioned in the user's pocket, to determine if the user has new e-mails.

Figure 5:
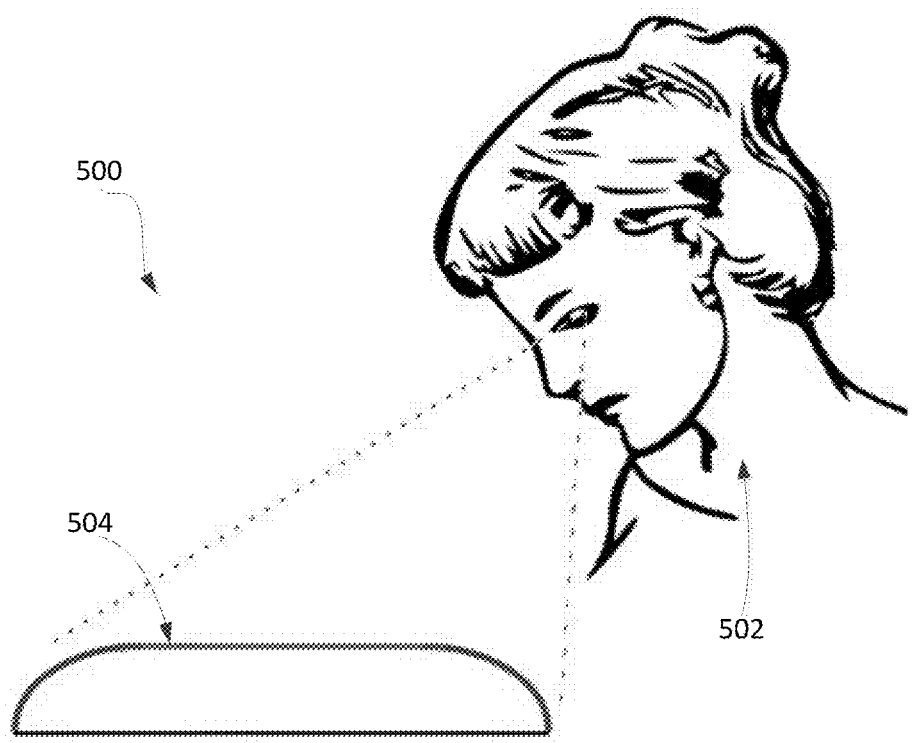
FIG. 5 shows another embodiment of a system for providing haptically-enabled conformed and multifaceted displays.

FIG. 5 shows another embodiment of a system for providing haptically-enabled conformed and multifaceted displays. In this example, the system 500 comprises a user 502 viewing a conformed display 504. In other embodiments, the user 502 may be viewing a multifaceted display.

In some embodiments, the computing device may determine the angle in which a user 502 is viewing the display. In some embodiments, the computing device may determine the user's 502 viewing angle via signals from one or more sensors. For example, in some embodiments, the computing device may determine the angle in which a user 502 may be viewing the display via signals from a camera, a gyroscope, or pressure sensor. For instance, in some embodiments, the computing device may receive signals from a camera (e.g., a front-facing camera positioned within the computing device) and determine the position of the user's 502 head or eyes relative to the computing device. In some embodiments, the computing device may receive signals from a gyroscope and determine the orientation of the computing device. The computing device may use the determined orientation to determine an angle at which a user 502 may be viewing the display. Further, in some embodiments, the computing device may receive signals from one or more pressure sensors and determine how a user 502 may be holding the computing device. For example, different configurations of the user's 502 fingers on the computing device may be associated with different pressure sensor measurements. Based on the determined configuration of the user's 502 fingers, the computing device may determine an angle at which a user 502 may be viewing the display.

In some embodiments, the computing device may output haptic effects based on the angle in which the user 502 is viewing the conformed display 504 or the multifaceted display. In some embodiments, the computing device may output haptic effects based on whether a portion of a virtual object with which the user 502 is visible to the user. In some embodiments, the computing device may output haptic effects based on whether a portion of a conformed display 504 or multifaceted display is visible to the user. For example, in some embodiments, the user 502 may be playing a game on a computing device. The user 502 may be viewing the conformed display 504 such that the user 502 can perceive the front side 506 and top side 508 of the conformed display 504 (and the front and top sides of a virtual object output on the conformed display 504), but not the back side 510 of the conformed display 504 (or the virtual object). In some embodiments, upon the user 502 interacting with the front side 506 or top side 508 of the conformed display 504, the computing device may output a haptic effect (e.g., an increase in a perceived coefficient of friction on the conformed display 504). Conversely, upon the user 502 interacting with the back side 510 of the conformed display 510, the computing device may not output a haptic effect. In some embodiments, outputting haptic effects based on whether a portion of a virtual object or conformed display 504 is visible to the user may provide a more challenging and rewarding gaming experience.

Figure 6:
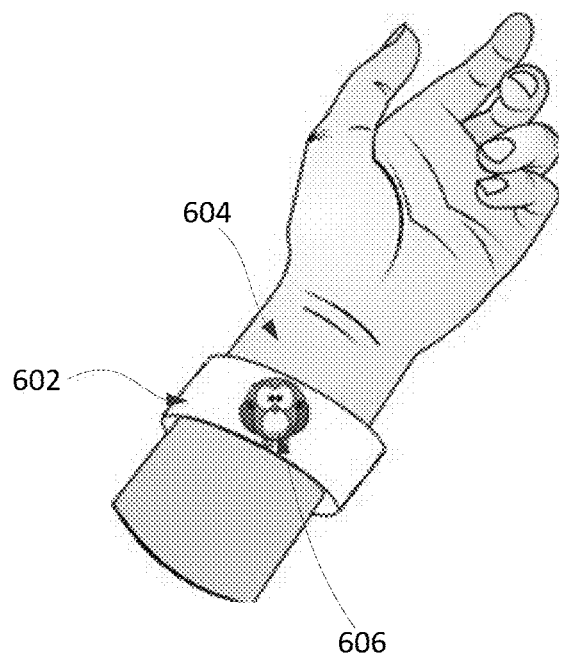
FIG. 6 shows another embodiment of a system for providing haptically-enabled conformed and multifaceted displays.

FIG. 6 shows another embodiment of a system for providing haptically-enabled conformed and multifaceted displays. In this example, the display 602 is a cylindrical shape. In other embodiments, the display 602 may be conformed to other shapes, for example, spheres, cubes, pyramids, cones, prisms, octahedrons, or tetrahedrons. The display 602 comprises a conformed or multifaceted display.

In some embodiments, the display 602 may be configured to be worn by a user (e.g., as a bracelet around the user's wrist 604, as shown in FIG. 6) and/or associated with an article configured to be worn by the user. For example, in some embodiments, the display 602 may be configured to be worn around a user's arm, wrist, leg, hand, finger, foot, or head. For instance, the display 602 may be associated with an article comprising a ring, headband, bracelet, anklet, watch, or wristband.

In some embodiments, the display 602 may be configured to be grasped by the user and/or associated with a graspable device. For example, in some embodiments, the display 602 (or multifaceted display) may be associated with a mobile device, a mobile device holder, a tablet, an e-reader, a laptop, a gamepad, a game system controller, a steering wheel, a joystick, a toy, a figurine, or a gear shifter.

In some embodiments, the display 602 may output a virtual object 606. In this example, the display 602 is outputting a virtual object 606 comprising an avatar. In some embodiments, as the user rotates the display 602 (e.g., around the user's wrist), the computing device may output different views (e.g., side and back views) of the virtual object 606. In other embodiments, the portion of the display 602 visible to the user may output one view of the virtual object 606, while a portion of the display 602 not visible to the user may output a different view of the virtual object 606. For example, in the embodiment shown in FIG. 6, the portion of the display 602 that is visible to the user is outputting the front of the avatar. Further, in some embodiments, the portion of the display 602 not visible to the user (e.g., wrapped around the back side of the user's wrist) may output the back of the avatar.

In some embodiments, upon the occurrence of an event (e.g., a user interacting with the virtual object 606), the computing device may output a haptic effect. For example, in some embodiments, upon a user interacting with the front view of the avatar, the computing device may output a haptic effect comprising, for example, a vibration. Further, in some embodiments, upon a user interacting with the back view of the avatar, the computing device may output a haptic effect comprising, for example, an increase in a perceived coefficient of friction. Thus, in some embodiments, different haptic effects may be associated with different sides or views of a virtual object. In some embodiments, a user may be able to determine (e.g., via haptic effects) which side or view or piece of a virtual object with which the user may be interacting, without having to look at the display.

In some embodiments, the display 602 may be, for example, cylindrical. For instance, in some embodiments, the display 602 may be in the shape of a cylindrical can. In some embodiments, the display 602 may output all the sides of a virtual object 606, such that the user perceives the virtual object 606 in three dimensions. In some embodiments, the user may control the virtual object 606 via the display 602. For example, in some embodiments, upon the user manipulating (e.g., tilting, rotating, or moving) the display 602, a characteristic (e.g., the virtual position, orientation, color, size, texture, or type) of the virtual object 606 may change.

Further, in some embodiments, a computing device may output one or more haptic effects based in part on a characteristic of the virtual object. In some embodiments, the computing device may output haptic effects configured to mimic the characteristics of a virtual object output on the display 602. For example, in some embodiments, the virtual object may comprise, for example, a figurine. In some embodiments, the computing device may output a haptic effect based on the position of the figurine's body parts. For example, in one embodiment, the virtual figurine may have its arms to the side of its body. Upon the user interacting with the display 602, the computing device may output a haptic effect comprising, for example, a smooth sensation. In some embodiments, the virtual figurine may have its arms outstretched. Upon the user interacting with the front or back of the display 602 (which may be outputting, for example, the front or back of the virtual figurine), the computing device may output a haptic effect comprising, for example, a smooth sensation. Further, upon the user interacting with the sides of the display 602 (which may be outputting, for example, the outstretched arms of the virtual figurine), the computing device may output a haptic effect comprising, for example, a simulated bumpy texture.

Illustrative Methods for Haptically-Enabled Conformed and Multifaceted Displays

Figure 7:
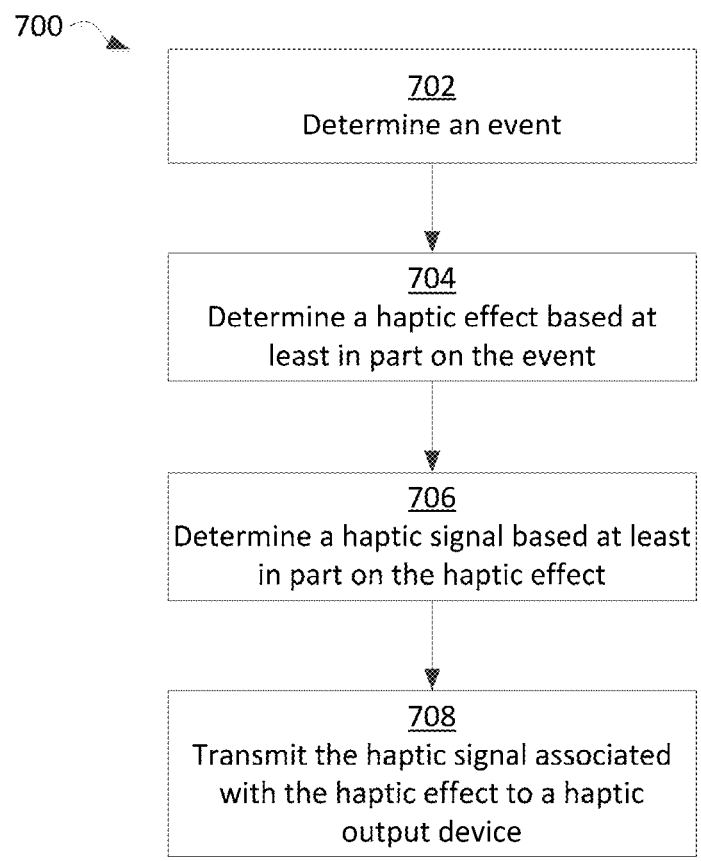
FIG. 7 is a flow chart of steps for performing a method for providing haptically-enabled conformed and multifaceted displays according to one embodiment.

FIG. 7 is a flow chart of steps for performing a method for providing haptically-enabled conformed and multifaceted displays according to one embodiment. In some embodiments, the steps in FIG. 7 may be implemented in program code that is executed by a processor, for example, the processor in a general purpose computer, a mobile device, or a server. In some embodiments, these steps may be implemented by a group of processors. In some embodiments one or more steps shown in FIG. 7 may be omitted or performed in a different order. Similarly, in some embodiments, additional steps not shown in FIG. 7 may also be performed. The steps below are described with reference to components described above with regard to system 100 shown in FIG. 1.

The method 700 begins at step 702 when the processor 102 determines an event. In some embodiments, an event may comprise, for example, interacting with the touch-sensitive surface 116 (e.g., by sliding a finger across or gesturing on the touch-sensitive surface 116) or the computing device 101, or a program event (e.g., the execution of software). For example, in some embodiments, the processor 102 may determine an event if the user taps a finger on the touch-sensitive surface 116 at a location associated with a virtual object (e.g., a menu). In some embodiments, the processor 102 may determine an event (e.g., tilting or moving the computing device) via signals from sensors 132.

The method 700 continues at step 704 when the processor 102 determines a haptic effect based at least in part on the event. In some embodiments, the processor 102 may rely on programming contained in haptic effect determination module 126 to determine the haptic effect. In some embodiments, haptic effect determination module 126 may comprise a lookup table. In some embodiments, processor 102 may use the lookup table to associate events with particular haptic effects (e.g., textures).

For example, in one embodiment, the event is based on game activity (e.g., a gunshot, a level completion, or an explosion). In some embodiments, the computing device 101 may output a virtual object (e.g., a virtual car) that the user can control to complete certain objectives (e.g., successfully navigating the car around a pedestrian). As the user completes objectives, the computing device 101 may determine associated haptic effects.

In some embodiments, the processor 102 may determine the haptic effect based at least in part on a characteristic (e.g., size, shape, color, positioning, scale, orientation, content, or texture) of a virtual object. For example, in some embodiments, the processor 102 may determine an event comprising a user interaction with a virtual object (e.g., a virtual cube) via the touch-sensitive surface 116. The processor may determine a haptic effect based on the user interaction and a characteristic of the virtual object, for example, the virtual object's size or texture.

In some embodiments, a user may have a "haptic profile" in which the user can determine and save in memory 104 a "profile" of the haptic effects the user would like associated with particular events. For example, in one embodiment, a user can select from a list of available haptic effects and associate one of these haptic effects with a virtual object output by the computing device 101. In some embodiments, the list may comprise, for example, haptic effects such as an intense vibration, a light vibration, a surface deformation (e.g., raising or lowering a portion of the surface of the touch-sensitive surface 116), or textures, such as bumpy, rubbery, or smooth. In some embodiments, the processor 102 may consult with the user's haptic profile to determine which haptic effect to generate. For example, if the user's haptic profile associates interaction with a virtual object with an intense vibration, in response to the user placing a finger on the touch-sensitive surface 116 over the virtual object, the processor 102 may determine a haptic effect comprising an intense vibration.

The method 700 continues at step 706 when processor 102 determines a haptic signal based at least in part on the haptic effect. In some embodiments, the processor 102 may access drive signals stored in memory 104 and associated with particular haptic effects. In one embodiment, a signal is generated by accessing a stored algorithm and inputting parameters associated with an effect. For example, in such an embodiment, an algorithm may output data for use in generating a drive signal based on amplitude and frequency parameters. As another example, a haptic signal may comprise data sent to an actuator to be decoded by the actuator. For instance, the actuator may itself respond to commands specifying parameters such as amplitude and frequency.

The method 700 continues at step 708 when the processor 102 transmits the haptic signal to the haptic output device 118. The haptic output device 118 receives the haptic signal and outputs the haptic effect. In some embodiments, the haptic effect comprises a vibration, a change in a perceived coefficient of friction, a simulated texture, or a surface deformation.

Advantages of Haptically-Enabled Conformed and Multifaceted Displays

There are numerous advantages to haptically-enabled conformed and multifaceted displays. Such systems may allow the user to make a state determination (e.g., determine the mode a device is in) without looking at the device. Thus, the user may be able to maintain focus on other tasks. For example, a user may be able to make determinations with regard to available operations in a program or on a user interface, without having to visually focus on the display. Similarly, a haptic effect may serve as a confirmation that an operation is available, has been completed, or is of a certain level of importance. Further, in some embodiments, the user may be able to make state determinations by interacting with portions of the device that may be more convenient or accessible to a user. For example, in some embodiments, due to the curvature of a conformed display (or the configuration of a multifaceted display), the user may be able to make state determinations by interacting with sides of a device, for example, positioned in the user's pocket.

In some embodiments, haptically-enabled conformed and multifaceted displays may provide a more realistic or immersive user experience. For example, in some embodiments, a user may be able to interact with different sides (e.g., the left, right, and top) of a virtual object output on a conformed or multifaceted display. In response to the user interaction, in some embodiments, the computing device may output a haptic. For example, in some embodiments, the computing device may output a haptic effect configured to simulate the texture of the area of the virtual object with which the user is interacting. Such haptic effects may allow the user to perceive the virtual object more realistically.

In some embodiments, haptic effects may combat the feeling of the smooth and/or curved configuration of conformed and multifaceted displays. For example, in some embodiments, a computing device may output a virtual object (e.g., a brick) on a conformed display. While interacting with the virtual object, the user may perceive the smooth, curved shape of a conformed display, which may be a tactile sensation that may not correspond well with the virtual object. In some embodiments, haptic effects may counteract the feeling of the smooth, curved display surface, and may allow the user to more realistically perceive a virtual object output on the display.

Further, in some embodiments, haptically-enabled conformed or multifaceted displays may allow such displays to replace conventional switches. This may allow conformed or multifaceted displays to operate as multifunction controllers and/or to be used in previously unused places. In some embodiments, using conformed or multifaceted displays as multifunction controllers or in previously unused places may reduce costs and increase overall user satisfaction.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
   a touch-sensitive surface comprising a curvature formed from a first surface of the touch-sensitive surface being on a first plane and a second surface of the touch-sensitive surface being on a second plane different from the first plane;
   a processor coupled to the touch-sensitive surface;
   a memory on which instructions executable by the processor are stored to cause the processor to:
      determine an interaction with the touch-sensitive surface;
      determine a haptic effect based at least in part on the interaction with the touch-sensitive surface, wherein the haptic effect is configured to offset a physical feeling of the curvature in the touch-sensitive surface;
      determine a haptic signal based at least in part on the haptic effect; and
      transmit the haptic signal associated with the haptic effect; and
   a haptic output device configured to receive the haptic signal and output the haptic effect.

2. The system of claim 1, wherein the touch-sensitive surface comprises a conformed display that is conformed around at least one surface of a device.

3. The system of claim 1, wherein the touch-sensitive surface comprises a multifaceted display.

4. The system of claim 3, wherein the first surface is connected to the second surface by a moveable joint.

5. The system of claim 1, wherein the interaction is a first interaction with the first surface, and wherein the processor is further configured to:
   determine a second interaction with the second surface;
   determine a second haptic effect based at least in part on the second interaction with the second surface;
   determine a second haptic signal based at least in part on the second haptic effect; and
   transmit the second haptic signal associated with the second haptic effect to the haptic output device.

6. The system of claim 1, wherein a periphery of the touch-sensitive surface defines a cylindrical, spherical, cubic, pyramid, prism, octahedron, tetrahedron, or cone shape.

7. The system of claim 1, wherein the touch-sensitive surface is associated with a wearable device comprising a ring, headband, bracelet, anklet, watch, or wristband.

8. The system of claim 1, wherein the touch-sensitive surface further comprises a third surface adjacent to the first surface, wherein the third surface is on a third plane different from the first plane and the second plane.

9. A method comprising:
   determining an interaction with a touch-sensitive surface comprising a curvature formed from a first surface of the touch-sensitive surface being on a first plane and a second surface of the touch-sensitive surface being on a second plane different from the first plane;
   determining a haptic effect based at least in part on the interaction with the touch-sensitive surface, wherein the haptic effect is configured to offset a physical feeling of the curvature in the touch-sensitive surface;

determining a haptic signal based at least in part on the haptic effect; and transmitting the haptic signal associated with the haptic effect to a haptic output device, wherein the haptic output device is configured to receive the haptic signal and output the haptic effect.

10. The method of claim 9, wherein the touch-sensitive surface comprises a conformed display that is conformed around at least one surface of a device.

11. The method of claim 9, wherein the touch-sensitive surface comprises a multifaceted display.

12. The method of claim 9, wherein the first surface is connected to the second surface by a moveable joint.

13. A non-transient computer readable medium comprising program code, which when executed by a processor is configured to cause the processor to:

determine an interaction with a touch-sensitive surface comprising a curvature formed from a first surface of the touch-sensitive surface being on a first plane and a second surface of the touch-sensitive surface being on a second plane different from the first plane;

determine a haptic effect based at least in part on the interaction with the touch-sensitive surface, wherein the haptic effect is configured to offset a physical feeling of the curvature in the touch-sensitive surface;

determine a haptic signal based at least in part on the haptic effect; and transmit the haptic signal associated with the haptic effect to a haptic output device, wherein the haptic output device is configured to receive the haptic signal and output the haptic effect.

14. The non-transient computer readable medium of claim 13, wherein the touch-sensitive surface comprises a conformed display that is conformed around at least one surface of a device.

15. The non-transient computer readable medium of claim 13, wherein the touch-sensitive surface comprises a multifaceted display.

16. The system of claim 1, wherein the curvature of the touch-sensitive surface is formed in a transition surface positioned between and physically connecting the first surface and the second surface of the touch-sensitive surface; and wherein the interaction with the touch-sensitive surface comprises an interaction with the transition surface.

17. The system of claim 16, wherein:

the touch-sensitive surface is a touch-screen display;

the interaction is with a graphical object displayed via the transition surface; and the haptic effect is based at least in part on the graphical object.

18. The system of claim 16, wherein the touch-sensitive surface is a touch-screen display, and wherein the memory further includes instructions executable by the processor to cause the processor to:

display, via the first surface, a first side of a graphical object;

display, via the second surface, a second side of the graphical object; and display, via the transition surface, an edge of the graphical object that is between the first side of the graphical object and the second side of the graphical object.

19. The system of claim 18, wherein the haptic effect is configured to simulate the edge between the first side of the graphical object and the second side of the graphical object.

20. The system of claim 5, wherein the haptic effect is output to the first surface and the second haptic effect is output to the second surface.

* * * * *